(12) United States Patent
Grenier et al.

(10) Patent No.: US 8,657,560 B2
(45) Date of Patent: Feb. 25, 2014

(54) ENERGY EXTRACTION DEVICE WITH AT LEAST ONE BANK OF BLADES

(75) Inventors: Mario Grenier, Saint-Nicolas (CA); Thomas Grenier-Desbiens, Saint-Nicolas (CA); Alex Grenier-Desbiens, Saint-Nicolas (CA); Jérôme Grenier-Desbiens, Saint-Nicolas (CA)

(73) Assignee: WATT3 Inc., St-Nicolas, Quebec (CA)

( * ) Notice: Subject to any disclaimer, the term of this patent is extended or adjusted under 35 U.S.C. 154(b) by 1026 days.

(21) Appl. No.: 12/674,471

(22) PCT Filed: Sep. 5, 2008

(86) PCT No.: PCT/CA2008/001583
§ 371 (c)(1),
(2), (4) Date: Feb. 22, 2010

(87) PCT Pub. No.: WO2009/030047
PCT Pub. Date: Mar. 12, 2009

(65) Prior Publication Data
US 2011/0123332 A1    May 26, 2011

Related U.S. Application Data

(60) Provisional application No. 60/970,328, filed on Sep. 6, 2007.

(51) Int. Cl.
*F03D 7/06* (2006.01)
(52) U.S. Cl.
USPC .......................... 415/4.2; 416/120; 416/123

(58) Field of Classification Search
USPC ......... 416/132 B, 120, 121, 122, 123; 415/4.2
See application file for complete search history.

(56) References Cited

U.S. PATENT DOCUMENTS

| | | | |
|---|---|---|---|
| 384,232 A | 6/1888 | Brodrick |
| 811,218 A | 1/1906 | Harrington |
| 842,054 A | 1/1907 | Barker |
| 1,201,184 A | 10/1916 | Holben |
| 1,577,096 A | 3/1926 | Aust |
| 4,052,134 A | 10/1977 | Rumsey |
| 4,113,408 A | 9/1978 | Wurtz et al. |
| 4,115,027 A | 9/1978 | Thomas |
| 4,186,313 A | 1/1980 | Wurtz |
| 4,303,835 A | 12/1981 | Bair |
| 4,321,005 A | 3/1982 | Black |

(Continued)

FOREIGN PATENT DOCUMENTS

| | | |
|---|---|---|
| CA | 2158491 | 3/1997 |
| CA | 2197920 | 8/1998 |

(Continued)

*Primary Examiner* — Dwayne J White
(74) *Attorney, Agent, or Firm* — Price Heneveld LLP

(57) ABSTRACT

An energy extraction device for extracting energy from a flow of fluid is provided. The energy extraction device comprises a rotating member for rotatably mounting to a support structure, at least one rotatable bank of blades connected to the rotating member through a connection disposed radially from the main axis of rotation of the rotating member, and, a pitch control system for controlling the angular position of the at least one rotatable bank of blades relative to a direction of the flow of fluid. The rotating member has a main axis of rotation and the at least one bank of blades comprises an array of spaced-apart blades secured together. Each of the at least one bank of blades has a bank axis of rotation.

64 Claims, 10 Drawing Sheets

(56) References Cited

U.S. PATENT DOCUMENTS

| | | |
|---|---|---|
| 4,334,823 A | 6/1982 | Sharp |
| 4,468,169 A | 8/1984 | Williams |
| 4,496,847 A | 1/1985 | Parkins |
| 4,534,703 A | 8/1985 | Flavell |
| 4,545,729 A | 10/1985 | Storm |
| 4,609,827 A | 9/1986 | Nepple |
| 4,619,585 A | 10/1986 | Storm |
| 4,649,284 A | 3/1987 | Hsech-Pen |
| 4,679,985 A | 7/1987 | Worms |
| 4,681,512 A | 7/1987 | Barnard |
| 4,979,871 A | 12/1990 | Reiner |
| 5,183,386 A | 2/1993 | Feldman et al. |
| 5,193,978 A | 3/1993 | Gutierrez |
| 5,195,871 A | 3/1993 | Hsech-Pen |
| 5,226,806 A | 7/1993 | Lubbers |
| 5,256,034 A | 10/1993 | Sultzbaugh |
| 5,266,006 A | 11/1993 | Tsui et al. |
| 5,503,525 A | 4/1996 | Brown et al. |
| 5,855,470 A | 1/1999 | Holmes |
| 5,868,092 A | 2/1999 | Milidragovic |
| 6,113,350 A | 9/2000 | Liu |
| 6,179,563 B1 | 1/2001 | Minchey |
| 6,379,115 B1 | 4/2002 | Hirai |
| 6,543,999 B1 | 4/2003 | Polen |
| 6,609,889 B1 | 8/2003 | Vilsboll |
| 6,682,302 B2 | 1/2004 | Noble |
| 6,688,842 B2 | 2/2004 | Boatner |
| 6,840,738 B1 | 1/2005 | Swanberg |
| 6,872,045 B1 | 3/2005 | Weaver et al. |
| 6,942,454 B2 | 9/2005 | Ohlmann |
| 7,083,382 B2 | 8/2006 | Ursua |
| 7,094,017 B2 | 8/2006 | Kurita |
| 7,118,341 B2 | 10/2006 | Hartman |
| 7,131,812 B2 | 11/2006 | Brueckner |
| 7,242,108 B1 | 7/2007 | Dablo |
| 2001/0015557 A1 | 8/2001 | Roskey |
| 2003/0185666 A1 | 10/2003 | Ursua |
| 2004/0086373 A1 | 5/2004 | Page, Jr. |
| 2005/0008488 A1 | 1/2005 | Bruckner |
| 2007/0014658 A1 | 1/2007 | Mollinger |
| 2007/0243066 A1 | 10/2007 | Baron |
| 2009/0202346 A1 | 8/2009 | Baron |

FOREIGN PATENT DOCUMENTS

| | | |
|---|---|---|
| GB | 264219 | 1/1927 |
| GB | 2000556 | 1/1979 |
| JP | 2003056447 | 2/2003 |
| MD | 2644 B1 | 12/2004 |
| WO | 2005095793 | 10/2005 |

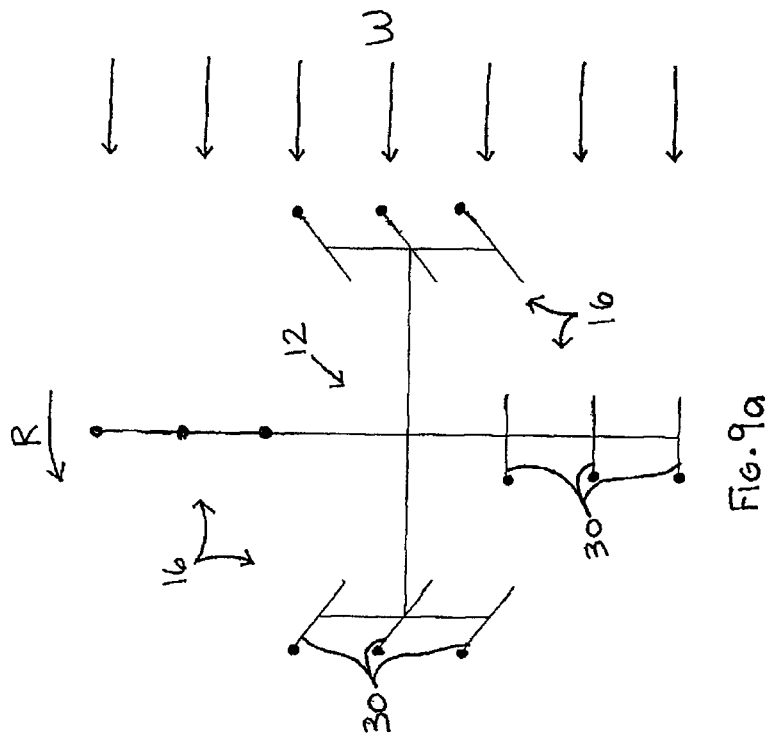
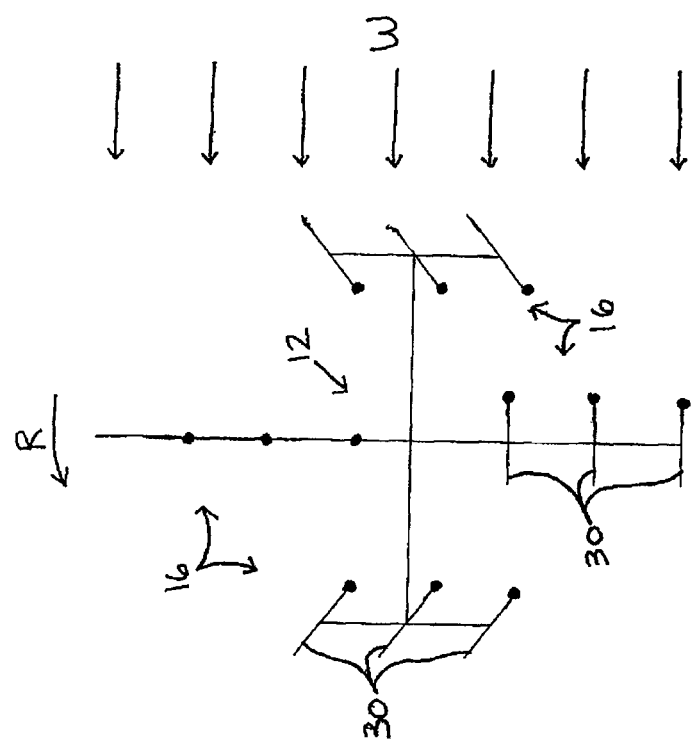
FIG. 9

ENERGY EXTRACTION DEVICE WITH AT LEAST ONE BANK OF BLADES

CROSS-REFERENCE TO RELATED APPLICATIONS

This application claims priority of U.S. provisional patent application 60/970,328 filed on Sep. 6, 2007, the specification of which is hereby incorporated by reference.

TECHNICAL FIELD

The invention relates generally to harnessing energy from a flow of fluid and, more particularly, to an energy extraction device for extracting energy from a flow of fluid.

BACKGROUND OF THE ART

Renewable and non-polluting sources of energy are currently in high demand. Traditional energy sources of generating energy are becoming less and less favoured due to their environmental disadvantages. It is well-known that power is available from the kinetic energy of a mass of air moving as wind and, as such, wind-powered electricity generators such as wind turbines are now increasingly becoming more attractive.

There are two basic types of wind turbines: 1) horizontal-axis wind turbines (HAWT) and 2) vertical axis wind turbines (VAWT). In HAWT the main rotor shaft and the electrical generator are typically located at the top of a tower and are pointed into the wind or parallel to the wind direction. Conversely, VAWT have the main shaft oriented vertically. One advantage of this arrangement is that the generator and gearbox can be placed at the bottom of the tower and therefore do not have to be supported at the top of the tower.

Different types of vertical axis turbines are disclosed in the prior art. For example, U.S. Pat. No. 7,083,382 discloses a vertical axis wind turbine comprising a rotating shaft to which at least one arm extends radially therefrom wherein at least one blade that is rotatably mounted to each arm. The blades are moveable from a first position having a first drag to a second position having a second drag. The first drag is higher than the second drag and thereby effects rotation of the shaft. Another embodiment is shown where multiple blades are mounted to each arm and are arranged in series so that each blade is individually rotatable.

U.S. Patent Publication No. 2007/0014658 A1 discloses a vertical axis wind mill with variable pitch flat blades and booster curtains. The variable-pitch flat blades are rotatably attached to truss-like radial arms and are rotatable about a vertical axis using a chain or belt that is driven by a motor. The booster curtains are also attached to the truss-like radial arm and can be raised and lowered using another separate motor. The movement of the flat blades and booster curtains are controlled by the weather vane.

U.S. Pat. No. 5,855,470 discloses a wind wheel having paddle plates which are rotated to face the wind in wind-direction travel and rotated edgewise when travelling against the wind. The orientation of each paddle plate is varied via the cooperation of interrelated gear trains and belt drives. The entire wind wheel is mounted to an upwind tongue that is rotatably attached to a platform and serves as a direction controller.

One known concern with vertical axis wind turbines is their comparatively low efficiency and their a rather complicated construction which may include a large number of moving parts. One reason for the lower efficiency is that the useful capture area of the blades is often low in relation to the area that is swept by the blades. Another concern is that vertical axis wind turbines have a tendency to become unstable during strong and/or turbulent winds.

SUMMARY

Accordingly, there is provided an energy extraction device suitable for extracting energy from a flow of fluid wherein the useful capture area of the blades in relation to the area swept by the blades is increased. The energy extraction device may be coupled to a generator for producing electricity and may also be stopped on request if the wind conditions become too severe or undesirable.

According to one broad aspect, there is provided an energy extraction device for extracting energy from a flow of fluid, the energy extraction device comprising: a rotating member rotatably mounted to a support structure and having a main axis of rotation; at least one rotatable bank of blades connected to the rotating member through a connection disposed radially from the main axis of rotation of the rotating member, the at least one bank of blades comprising an array of spaced-apart blades, each of the at least one bank of blades having a bank axis of rotation; and a pitch control system for controlling the angular position of the at least one rotatable bank of blades relative to a direction of the flow of fluid.

According to another aspect, there is provided a vertical axis wind turbine comprising: a rotating member mounted to a support structure, having a vertical main axis of rotation, and having a plurality of angularly spaced support arms extending radially from the main axis; a plurality of rotatable banks of blades wherein each bank of blades is connected to a corresponding support arm of the rotating member through a connection disposed at a distance from the main axis of rotation of the rotating member, each bank of blades comprising an array of spaced-apart blades, at least one of each of the bank of blades having a bank axis of rotation and each of the blades being rotatable about its own blade axis; and a pitch control system for controlling the angular position of the banks of blades relative to a wind direction.

According to a further aspect, there is provided a wind turbine comprising: a rotating member rotatably mounted to a support structure, having a main axis of rotation, and having a plurality of angularly spaced support arms extending radially from the main axis; a plurality of banks of blades wherein each bank of blades is connected to a corresponding support arm of the rotating member through a connection disposed at a distance from the main axis of rotation of the rotating member, each bank of blades comprising an array of spaced-apart and substantially parallel blades, at least one of each of the banks of blades having a bank axis of rotation and each of the blades being rotatable about its own blade axis; and a pitch control system for controlling the angular position of the banks of blades relative to a wind direction.

According to still another aspect, there is provided a vertical axis wind turbine comprising: a rotating member rotatably mounted to a support structure and having a vertical main axis of rotation; at least one bank of blades connected to the rotating member through a connection disposed radially from the main axis of rotation of the rotating member, the at least one bank of blades comprising an array of spaced-apart blades secured together, each of the blades being rotatable about its own blade axis; and a pitch control system for controlling the angular position of the blades relative to a wind direction.

In an embodiment, the spaced-apart blades of each of the at least one bank of blades are substantially parallel and secured together. Each bank axis of rotation can be substantially parallel to the main axis of rotation and each blade can be rotatable about its own blade axis. The rotation speed of the blades about their own axis can be controllable. If the blades are rotatable about their own blade axis, the angular position of each of the blades relative to the direction of the flow of fluid is controllable and adjusted in accordance with at least one of the speed of the flow of fluid, the direction of the flow of fluid, and a position of the at least one bank of blades including the blade.

In an embodiment, the pitch control system can comprise a vane coupled to the at least one bank of blades for adjusting the angular position the at least one bank of blades with the direction of the flow of fluid. It can include a bank gear coupled to the at least one bank of blades and a reference gear disposed along the main axis, the reference gear being independently rotatable from the rotating member and the bank gear being coupled to the reference gear for relative rotation. It can also include a stopping actuator coupled to the reference gear for rotating the reference gear. In an embodiment, the stopping actuator induces relative rotation between the vane and the reference gear. The pitch control system can further comprise a vane coupled to the reference gear, the vane being indicative of the direction of fluid flow. The gear ratio of the reference gear to the bank gear can be 1:2.

In an embodiment, the pitch control system comprises a vane indicative of the wind direction, a controller operatively connected to the vane for receiving wind direction information, the controller being operatively connected to a motor coupled to the at least one bank of blades for adjusting the angular position of the at least one bank of blades. It can include an anemometer operatively connected to the controller.

The rotation speed of the at least one bank of blades can be controllable.

Further details of these and other aspects of the present invention will be apparent from the detailed description and figures included below.

DESCRIPTION OF THE DRAWINGS

Reference is now made to the accompanying figures, in which:

FIG. 9a shows the rotation of the bank of blades during a first rotation and FIG. 9b shows the rotation of the bank of blades during a second rotation, consecutive to the first rotation.

DETAILED DESCRIPTION OF THE PREFERRED EMBODIMENTS

Figure 1:
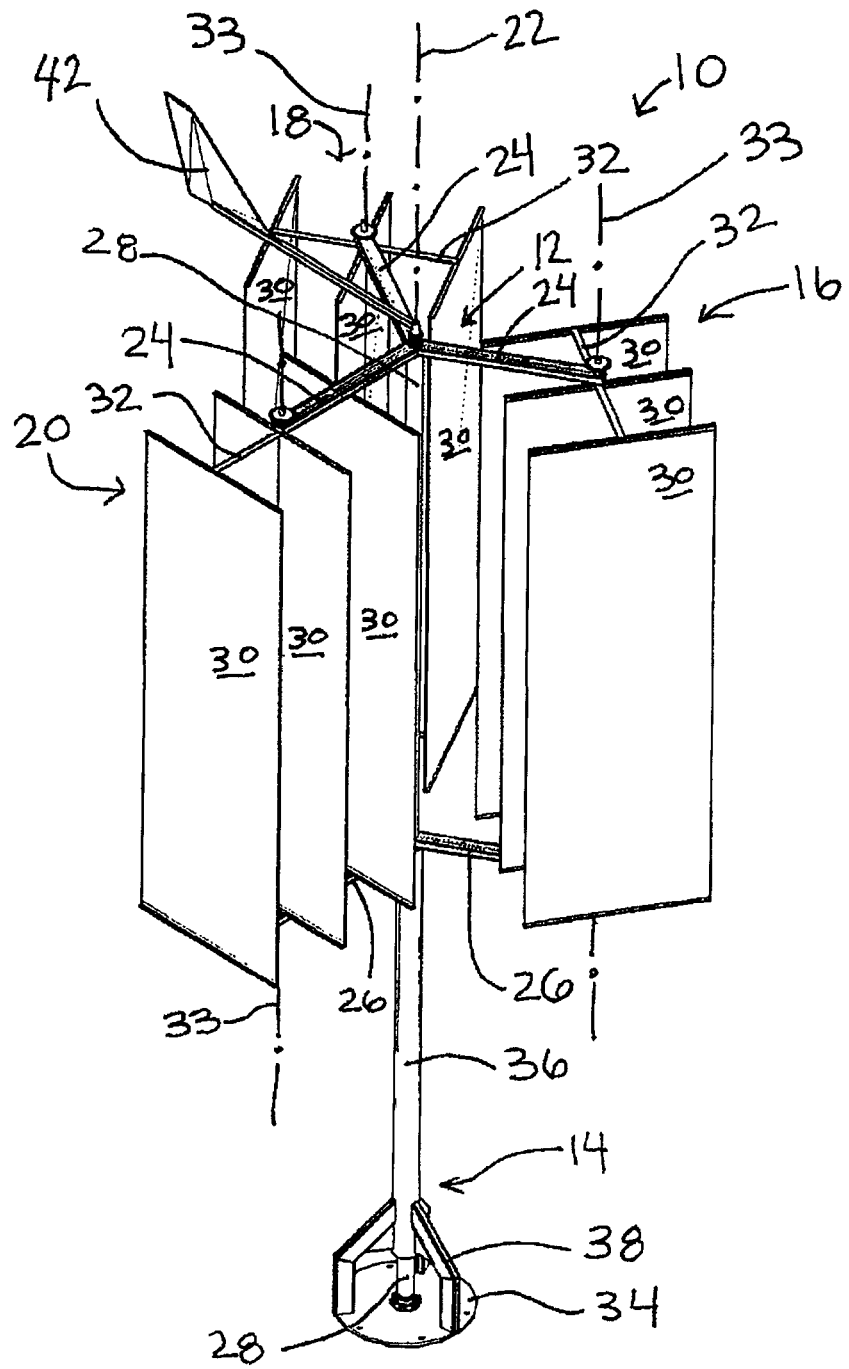
FIG. 1 is a perspective view of a vertical axis wind turbine according to one embodiment.

Referring now to FIG. 1, a vertical axis wind turbine in accordance with one embodiment is generally shown at 10. The wind turbine 10 is used to extract energy from a passing flow of air in the form of wind but could also be adapted to extract energy from a flow of other fluids such as water or the like. The wind turbine 10 comprises a rotating member generally shown at 12 rotatably mounted to a support structure generally shown at 14, three rotatable banks of blades generally shown at 16, 18 and 20 connected to the rotating member 12, and, a pitch control system for controlling the angular position of the banks of blades 16, 18 and 20 relative to the direction of the passing flow of air. The expression "vertical axis" is used in relation to the direction of fluid flow and is intended to encompass any axis that is substantially perpendicular to the fluid flow.

The rotating member 12 has a main axis of rotation 22 and comprises upper support arms 24 and lower support arms 26 connecting the banks of blades 16, 18 and 20 to a main shaft 28 which is hollow. The main shaft 28 may be coupled to a generator (not shown) for producing electricity. The arms 24 and 26 extend radially from the main shaft 28 and each set of corresponding upper and lower arms 24 and 26 are equally angularly spaced about the main axis 22. The banks of blades 16, 18 and 20 are connected to the arms 24 and 26 at connections that are disposed radially from the main axis of rotation 22. Each bank of blades 16, 18 and 20 comprises an array of spaced-apart substantially parallel blades 30 that are secured together by a framework 32. Each bank of blades 16, 18 and 20 is rotatable about its own bank axis 33.

The support structure 14 comprises a base plate 34 and a vertically extending housing tube 36 through which the main shaft 28 extends and is rotatably supported. The housing tube 36 is connected to the base plate 34 via braces 38. Accordingly, the housing tube 36 does not extend completely to the base plate 34 and a portion of the main shaft 28 is left exposed. The main shaft 28 is rotatably supported within the housing tube 36 with conventional bearings or cam followers which are not shown. The base plate 34 is used to secure the wind turbine 10 to a suitable base which is also not shown but would be apparent to a person skilled in the art.

Figure 2:
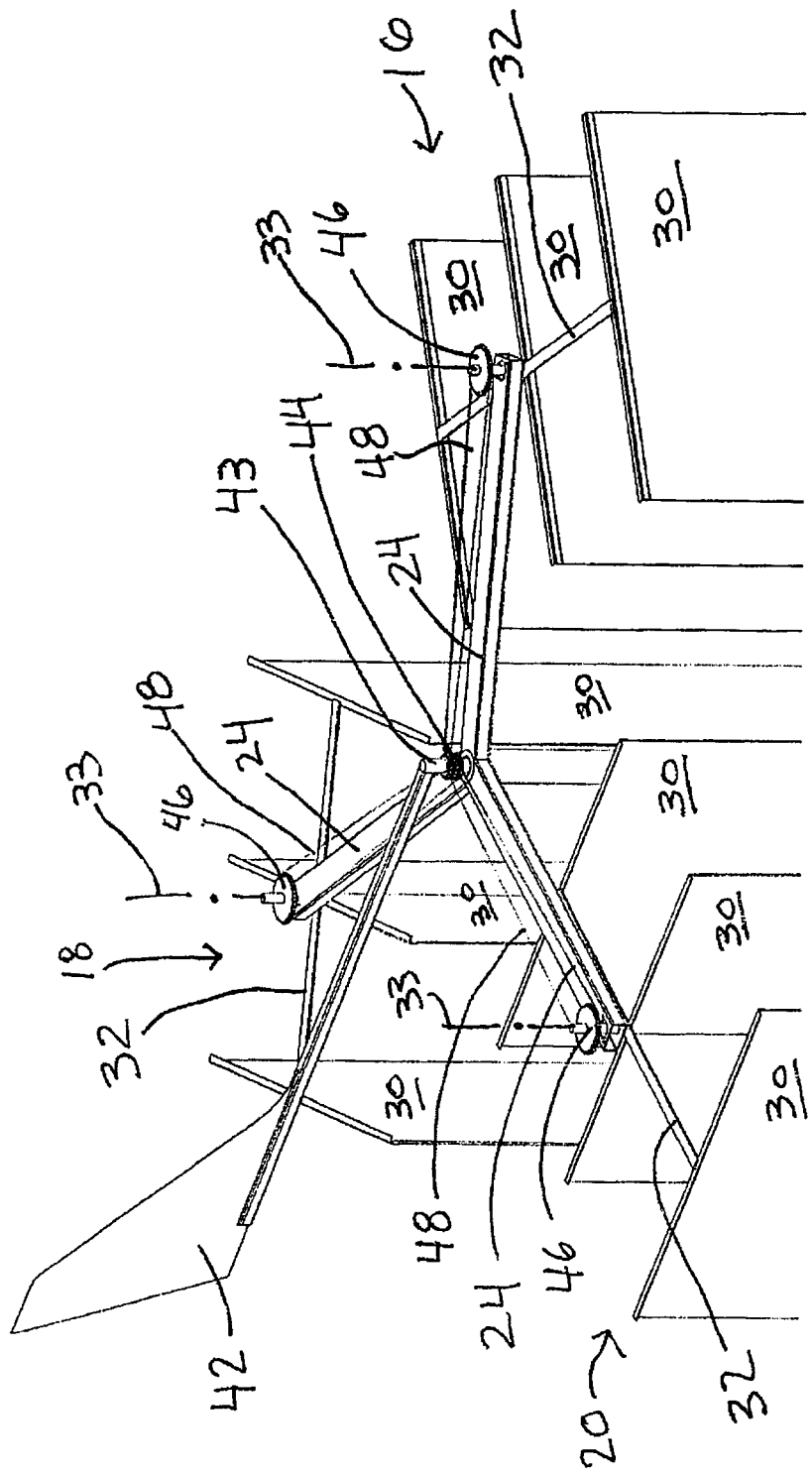
FIG. 2 is a partial perspective view of a top portion of the vertical axis wind turbine of FIG. 1 showing a pitch control system.
Figure 3A:
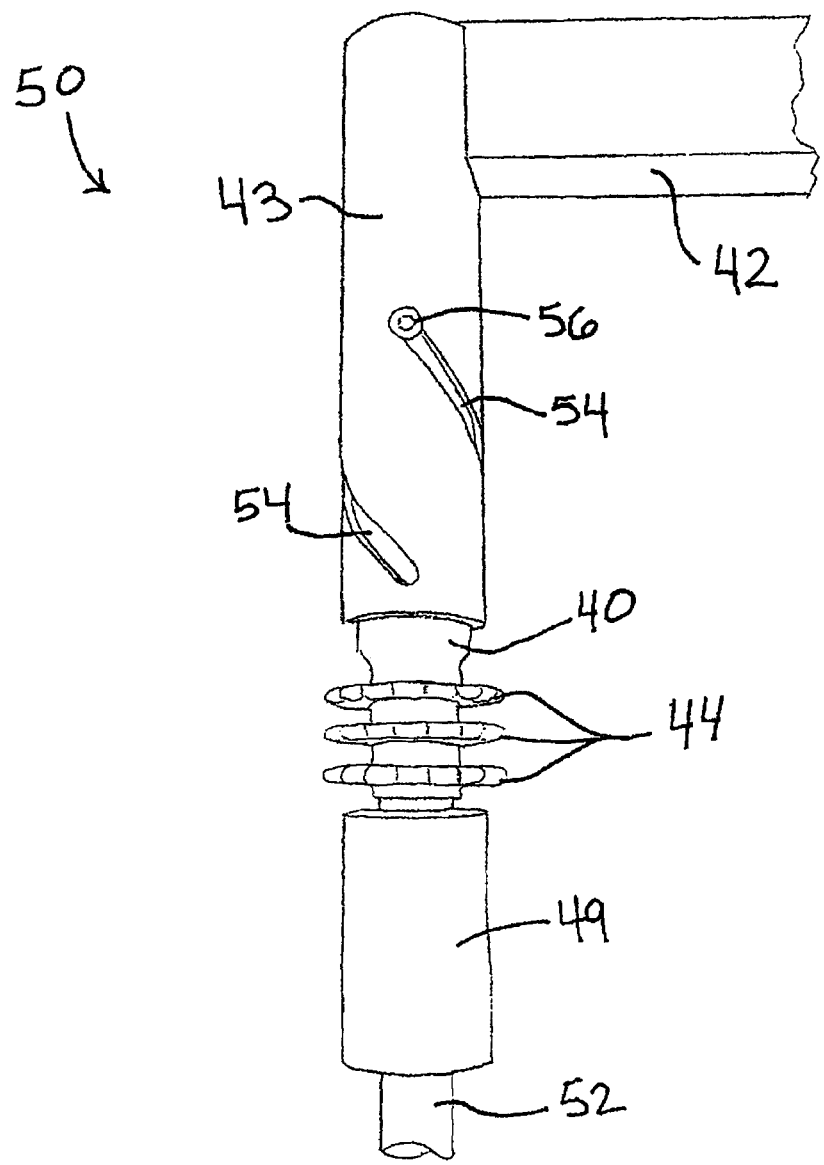
FIG. 3A is a perspective view of a stopping mechanism of the vertical axis wind turbine of FIG. 1 at a working position.
Figure 3B:
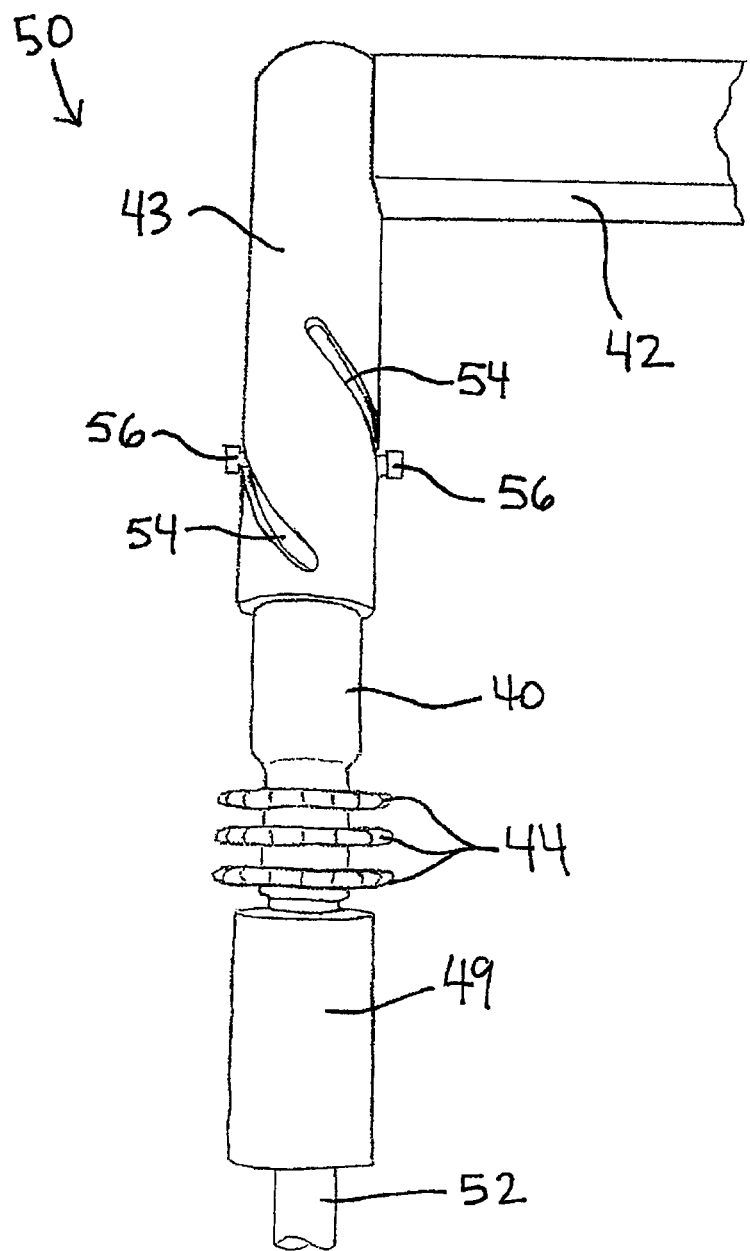
FIG. 3B is a perspective isometric view of the stopping mechanism of FIG. 3A at a stopping position.

The pitch control system is shown in FIGS. 2-3B. The pitch control system comprises a control shaft 40 (shown in FIGS. 3A and 3B) which is rotatably connected to the hollow main shaft 28, a weather vane 42 coupled to the control shaft 40 via a vane adaptor 43, three reference gears 44 disposed on the control shaft 40 and three corresponding bank gears 46, i.e. one for each bank of blades 16, 18 and 20. Each bank gear 46 is coupled to the framework 32 of its corresponding bank of blades 16, 18 and 20. Each bank gear 46 is also coupled to a corresponding reference gear 44 via an endless chain 48. The term gear is intended to encompass conventional toothed gears, pulleys, sprockets and the like. Similarly, the term endless chain is intended to include an endless belt that could be used in conjunction with pulleys. Alternatively, the reference gears 44 could also be coupled to their respective bank gears 46 using shafts. Other torque-transmitting arrangements could also be used and such modifications would be apparent to a person skilled in the art. The gear ratio between each reference gear 44 and each corresponding bank gear 46 is 1:2, meaning that for each full revolution of the reference gear 44, its corresponding bank gear 46 will rotate half of a revolution. The control shaft 40 is rotatably supported within the main shaft 28 by a sleeve 49 and therefore may rotate independently from the main shaft 28. An optional cover (not shown) may be placed over the gears 44, 46 and chains 48 to offer protection against the weather.

FIGS. 3A and 3B show a stopping mechanism generally shown at 50 that is used for stopping the rotation of the rotating member 12. The stopping mechanism 50 comprises a rod 52, helical slots 54 formed in the adaptor 43 and guide bolts 56 disposed within the slots 54 and secured to the control shaft 40. The rod 52 extends through the control shaft 40 and is secured on the inside of an upper portion of the adaptor 43. The rod 52 also extends downwardly through the main shaft 28 and through the base plate 34 under which it is coupled to an actuator (not shown) that is used to axially move the rod 52. The rod 52 may be actuated by a manual lever, hydraulic cylinder, electrical motor or any suitable actuator, as it will be described in more details below.

Figure 4:
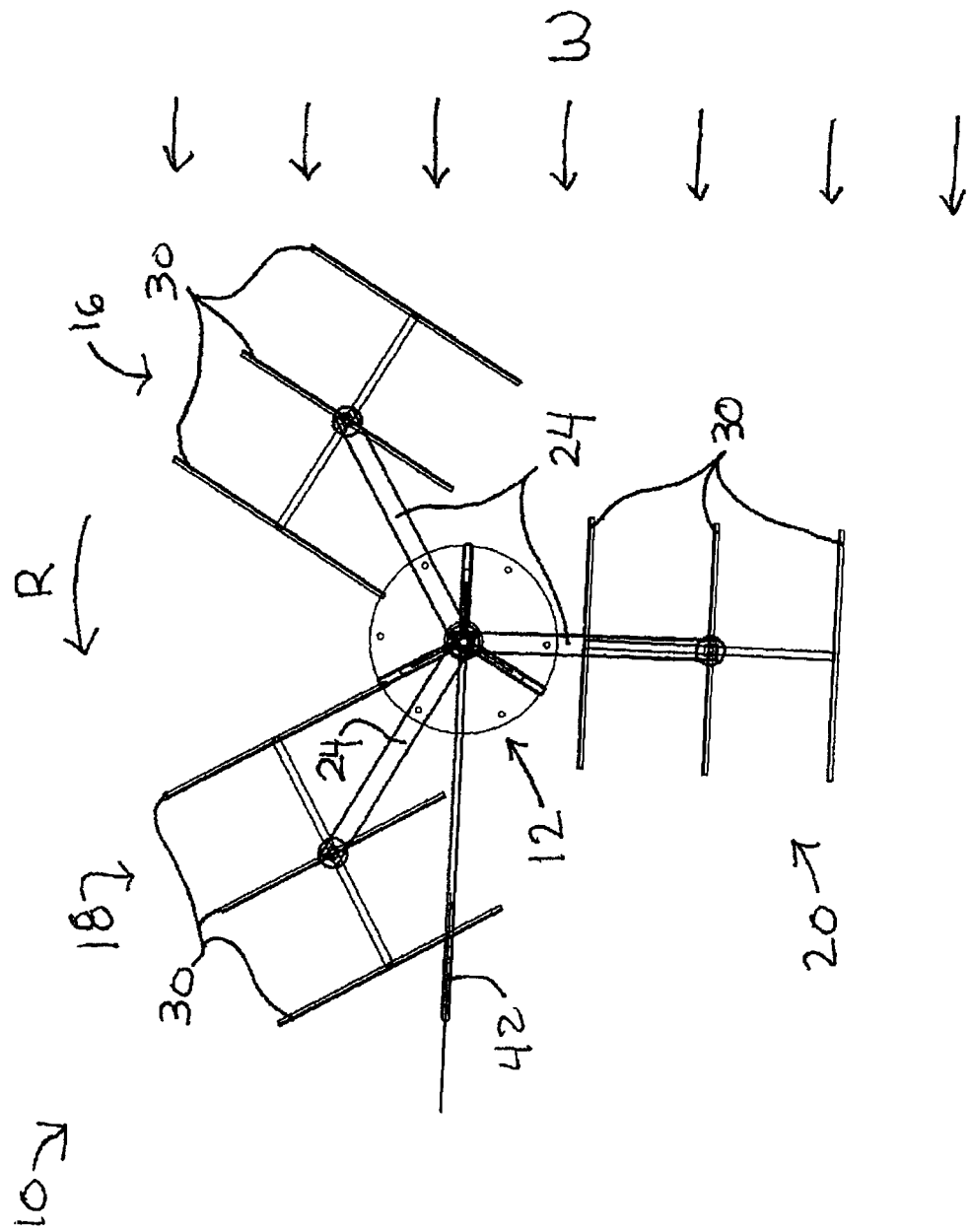
FIG. 4 is a top plan view of the vertical axis wind turbine of FIG. 1 showing banks of blades oriented in a driving position.

An operating or driving configuration of the wind turbine 10 is illustrated in FIG. 4. In this particular configuration, the direction of air flow or wind is labelled as W and the direction of rotation of the rotating member 12 is counter-clockwise and labelled R. Firstly and prior to operation of the wind turbine 10, the bank gears 46 must be coupled to the reference gears 44 so that the banks of blades 16, 18 and 20 are oriented in a driving configuration relative to each other as shown in FIG. 4. This orientation of the banks of blades 16, 18 and 20 causes the wind W to hit the blades 30 in such a manner as to induce rotation of the rotating member 12 in the direction R.

During operation, each bank of blades 16, 18 and 20 rotates about its respective bank axis 33 in relation to its corresponding reference gear 44 as the rotating member 12 rotates about the main axis 22. Accordingly, the banks of blades 16, 18 and 20 maintain their relative angular position in relation to each other. As mentioned previously, due to the gear ratio between the reference gears 44 and bank gears 46, the bank of blades 16, 18 and 20 each rotate one half of a revolution for each full revolution of the rotating member 12. This causes the bank of blades 16, 18 and 20 to continuously rotate between the positions shown in FIG. 4 as the rotating member 12 also rotates relative to the reference gears 44. As the wind W hits the blades 30 of the banks of blades 16 and 18, a resulting tangential force is transferred to the corresponding arms 24 and 26, which, consequently, causes the rotating member 12 to rotate in the direction R. Conversely, as the bank of blades 20 moves against the wind W as shown in FIG. 4, its orientation is such that the blades 30 are substantially parallel to the wind W in order to minimise opposing drag forces. The incremental rotation of one bank of blades 16, at 45-degree intervals, is shown in FIG. 5 and illustrates the orientation of the bank of blades 16, 18 and 20 relative to the wind W as each of them rotates about the main axis 22.

Figure 5:
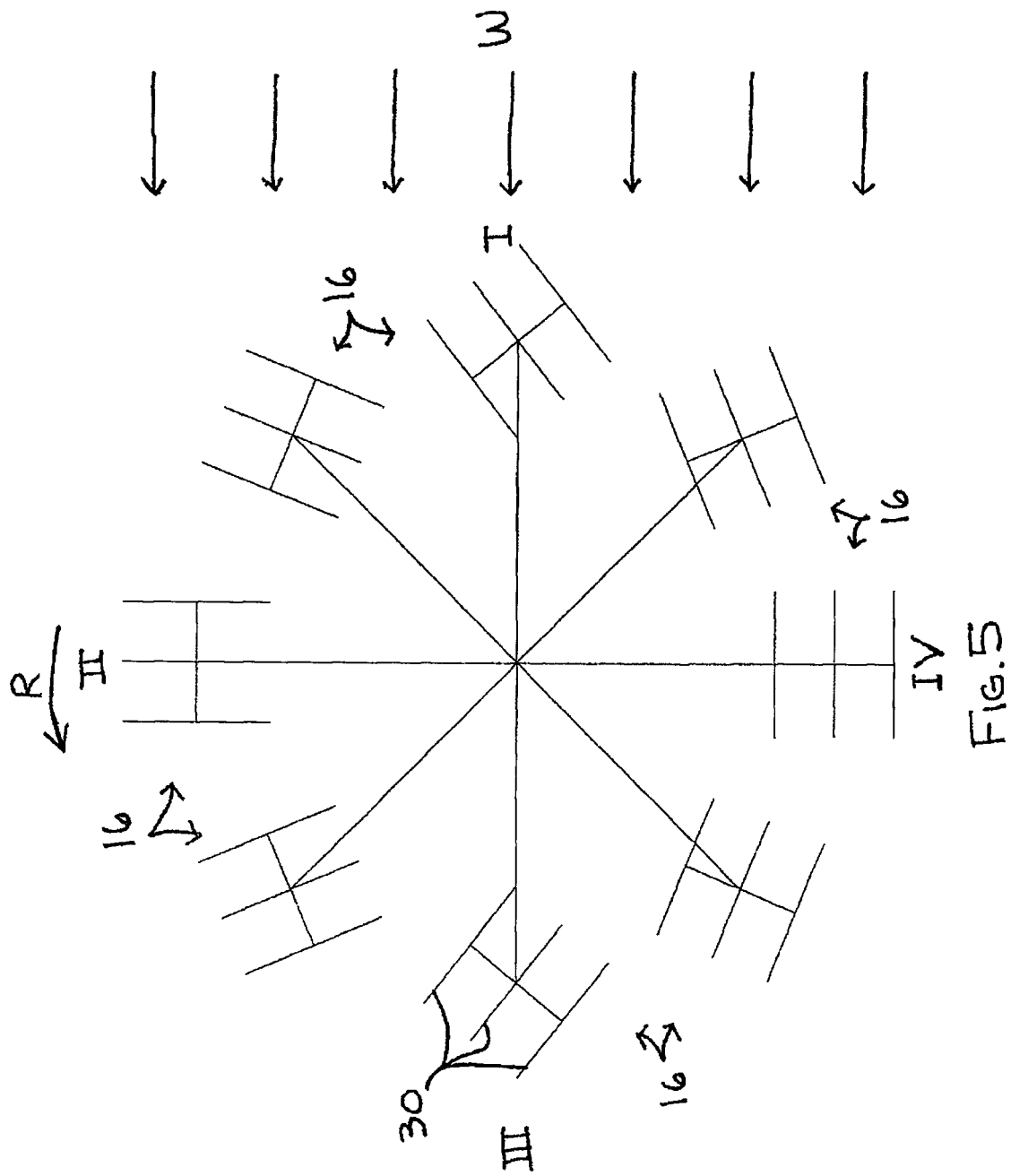
FIG. 5 is a top schematic view of a bank of blades of the vertical axis wind turbine of FIG. 1 showing the incremental rotation of the bank of blades about a main axis, at 45-degree intervals.

Referring to FIG. 5, four orthogonal positions of the bank of blades 16 are labelled as I, II, III and IV as the rotating member 12 rotates in the direction R. At positions I and III, the blades 30 are oriented at an angle of attack of about 45 degrees to the direction of the wind W and the tangential force exerted on the rotating member 12 is mainly due to lift forces (perpendicular to the fluid flow) generated by the wind W blowing against the blades 30. At position II, the bank of blades 16 is oriented so that the blades 30 are perpendicular to the wind W so as to maximise drag. Finally, at position IV, the bank of blades 16 is oriented so that the blades 30 are parallel to the wind W so as to minimise drag.

The parallel arrangement of the plurality of relatively flat blades 30 within the banks of blades 16, 18 and 20 provides a larger useful area to capture the wind W in relation to the area that is swept by the blades 30 in comparison with using a single blade mounted to each set of arms 24 and 26, or, using a plurality of blades mounted in series along each set of arms 24 and 26. The parallel arrangement of the blades 30 in the banks of blades 16, 18 and 20 also reduce the number of moving parts in comparison with a series arrangement.

Advantageously, the wind turbine 10 rotates at a relatively low speed and also comprises a built-in speed limiter. Since the propulsion of the wind turbine 10 is largely dependent on drag forces imposed on the blades 30, the tangential speed of blades 30 cannot exceed the speed of the wind W, otherwise braking occurs.

The weather vane 42 automatically and continuously orients itself in accordance with the direction of the wind W. Since the weather vane 42 is coupled to the control shaft 40, the orientation of the control shaft 40 and reference gears 44 is also varied in accordance with the direction of the wind W. The control shaft 40 is therefore indicative of the direction of the wind W and serves as a reference member from which the continuous orientation of the banks of blades 16, 18 and 20 is based. As the orientation of the control shaft 40 is varied based on the direction of the wind W, the orientation of each bank of blades 16, 18 and 20 is also varied or indexed accordingly. This pitch control system ensures that the proper relative orientation of each bank of blades 16, 18 and 20 is maintained in order to induce rotation of the rotating member 12 irrespective of the direction of the wind W.

The stopping mechanism 50 may be used to stop the rotating member 12 from rotating whenever desired. For example, it may be preferable to stop the rotating member 12 from rotating when maintenance is to be performed on the wind turbine 10 or in the event where wind conditions are undesirable or too severe and may cause the wind turbine 10 to become unstable and/or damaged. Essentially, the stopping mechanism 50 provides a means for overriding the pitch control system of the wind turbine 10 and causing the weather vane 42 and the control shaft 40 to rotate in relation to each other. Referring back to FIGS. 3A and 3B, there is shown that the rod 52 serves as a stopping actuator by vertically translating the weather vane 42 in relation to the control shaft 40. As the rod 52 and the weather vane 42 are vertically translated relative to the control shaft 40, the guide bolts 56 that are fixed to the control shaft 40 follow the trajectory of the helical grooves 54 formed in the adaptor 43, and consequently, the control shaft 40 rotates in relation to the weather vane 42. The weather vane 42 essentially remains stationary due to the force of the wind W acting upon it.

FIG. 3A shows the weather vane 42 and the control shaft 40 positioned in a working position and FIG. 3B shows the weather vane 42 and the control shaft 40 in a stopping position wherein the weather vane 42 and the control shaft 40 are rotated 90 degrees relative to each other. As the weather vane 42 is further pushed upwardly past the stopping position by the rod 52, the relative rotation between the control shaft 40 and the weather vane 42 exceeds 90 degrees and the rotating member 12 then starts rotating in the opposite direction. The rod 52 may be resiliently biased towards a working position.

Figure 6:
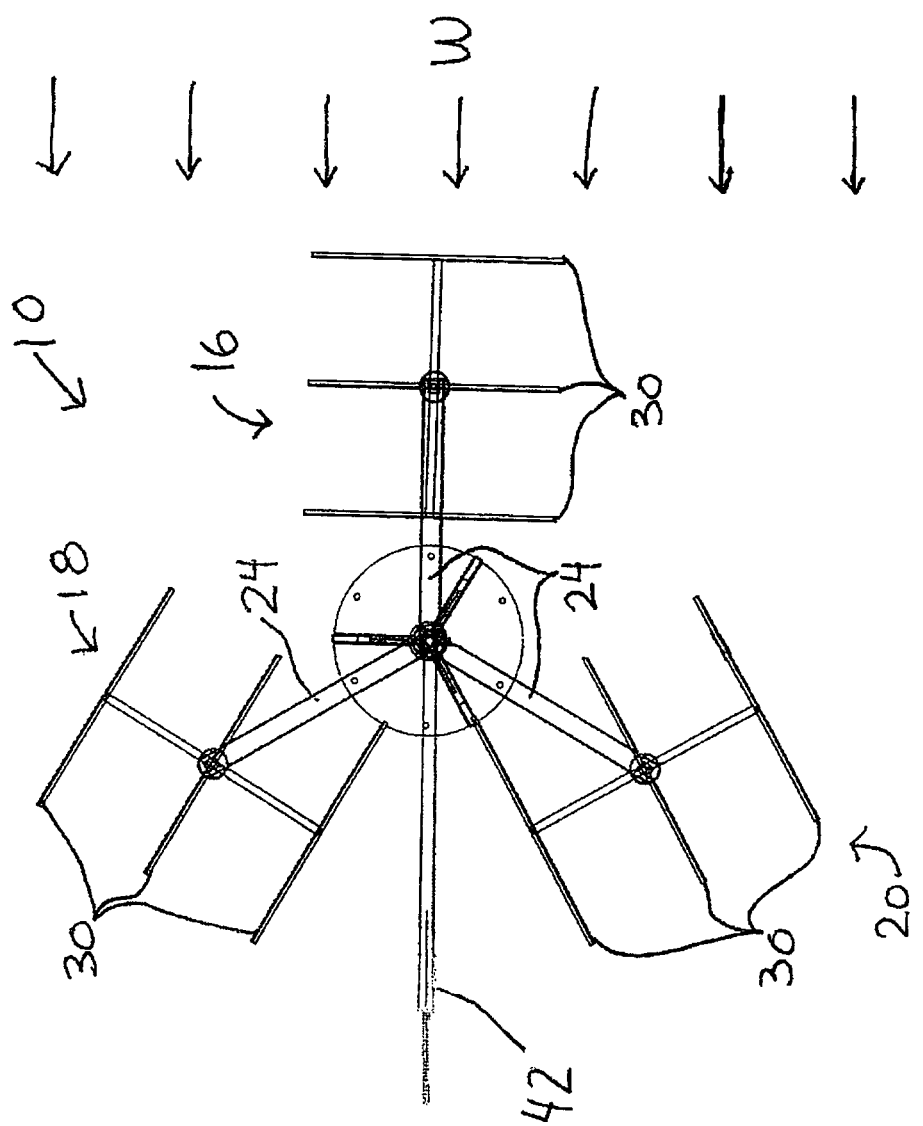
FIG. 6 is a top plan view of the vertical axis wind turbine of FIG. 1 showing banks of blades oriented in a stopping position.

A 90 degree rotation between the weather vane 42 and control shaft 40 causes each bank of blades 16, 18 and 20 to rotate 45 degrees about its respective bank axis 33. Upon this forced rotation of the banks of blades 16, 18 and 20, the rotating member 12 eventually stops rotating and automatically adopts the position shown in FIG. 6 relative to the wind W due to the weather vane effect that is produced. In this configuration, the blades 30 of the bank of blades 16 are perpendicular to the direction of the wind W and no tangential force is transmitted to the rotating member 12. Meanwhile, the banks of blades 18 and 20 are oriented such that their blades 30 transmit relatively equal and opposite tangential forces to the rotating member 12. These opposing tangential forces cancel each other and therefore no net tangential force is transmitted to the rotating member 12.

As mentioned above, each of the bank of blades 16, 18 and 20 rotates one half of a revolution for each full revolution of the rotating member 12. Thus, the wind turbine 10 can be stopped in an alternative stopped configuration (not shown) wherein the bank of blades 16 is rotated 90 degree, i.e. the bank of blades 16 is parallel to the wind W, and the bank of blades 18, 20 are rotated 90 degree in a clockwise direction. Thus, their blades 30 transmit relatively equal and opposite tangential forces to the rotating member 12 which cancel each other and therefore no net tangential force is transmitted to the rotating member 12.

Figure 7:
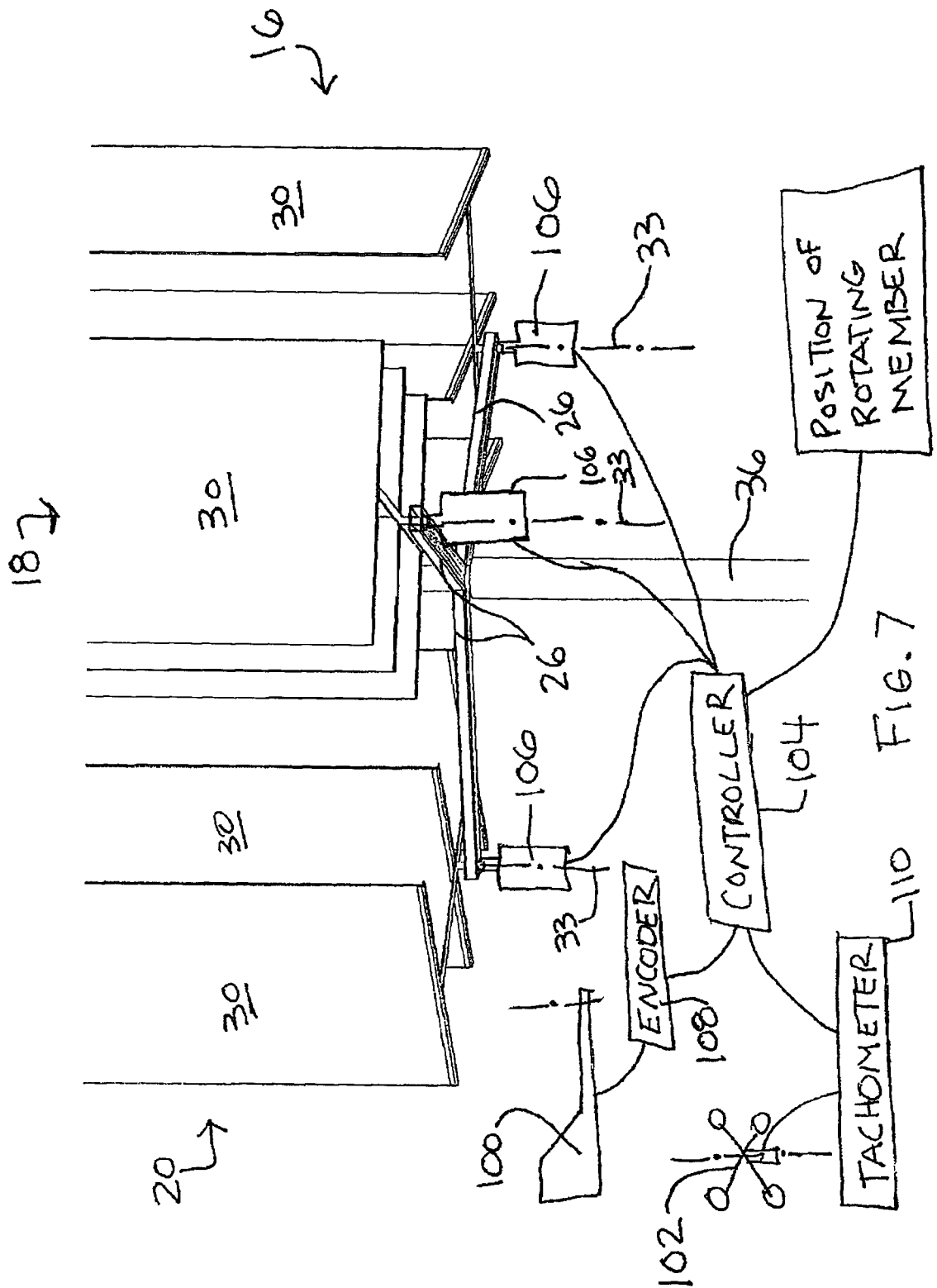
FIG. 7 is a partial perspective view of a lower portion of the vertical axis wind turbine of FIG. 1 showing a pitch control system according to another embodiment.

FIG. 7 shows a pitch control system in accordance with another embodiment of the present invention. This pitch control system comprises a weather vane 100, an anemometer 102, a controller 104 and individual motors 106 coupled to each bank of blades 16, 18 and 20. The motors 106 are preferably coupled to the banks of blades 16, 18 and 20 near the lower arms 26. This pitch control system is preferably a closed-loop control system wherein the controller 104 receives wind direction information from the weather vane 100 and wind speed information from the anemometer 102, and, controls the motors 106 accordingly. The weather vane 100 may be operatively connected to the controller via an encoder 108 and the anemometer 102 may be operatively connected to the controller via a tachometer 110. The weather vane 100 and the anemometer 102 may be secured to a stationary component of the wind turbine 10 or may be located at a distance from the wind turbine 10. The motors 106 may be stepper motors, servo motors or the like. Any suitable controller such as a personal computer, programmable logic controller (PLC) or the like may be used. The control signals to the motors 106 may be transmitted wirelessly to avoid excessive routing of cables. Power cables (not shown) may be routed to the motors using a slip ring arrangement or the like to prevent winding around the main shaft 28.

Figure 8:
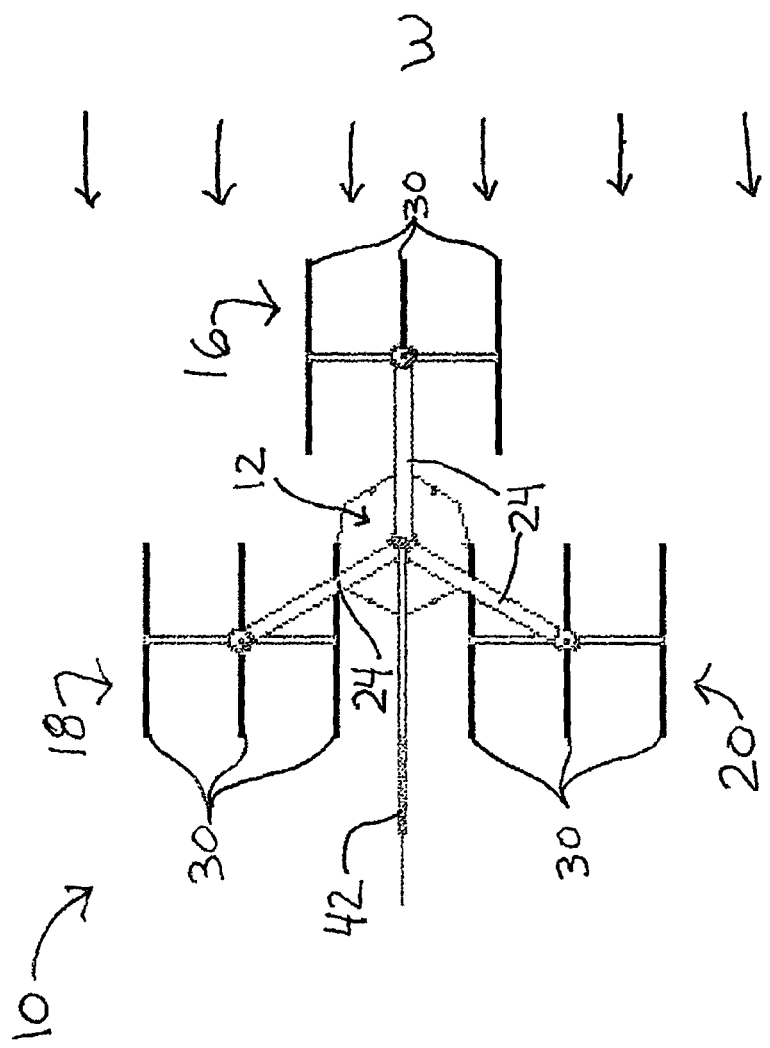
FIG. 8 is a top view of the vertical axis wind turbine of FIG. 1 showing banks of blades oriented in an alternate stopping position; and, FIG. 9 includes FIG. 9a and FIG. 9b and is a top schematic view of a bank of blades of a vertical axis wind turbine according to another embodiment showing the incremental rotation of the bank of blades at 90-degree intervals and the individual rotation of the blades.

In order to maintain rotation of the rotating member 12, the motors 106 continuously rotate the banks of blades 16, 18 and 20 to maintain the relative angular orientation of the banks of blades 16, 18 and 20 and produce the configuration shown in FIG. 4. The controller 104 may use wind direction information, wind speed information and may monitor the angular position of the rotating member 12 in order to continuously and properly orient the banks or blades 16, 18 and 20. Upon receiving a command to stop the wind turbine 10, the controller 104 may instruct the motors 106 to orient the banks of blades 16, 18 and 20 in the configuration shown in FIG. 6 that is previously described. Alternatively, the banks of blades 16, 18 and 20 may also be oriented as shown in FIG. 8. In this configuration, each bank of blades 16, 18 and 20 is oriented such that all the blades 30 are parallel to the direction of the wind W so as to minimize drag and lift forces. Hence, the blade configuration shown in FIG. 8 also does not cause any net tangential force to be transmitted to the rotating member 12.

An alternate embodiment of the vertical axis wind turbine 10 is shown in FIG. 9. In this embodiment, each bank of blades 16, 18 and 20 proportionally rotates by the same amount as the rotating member 12. Also, the individual blades 30 are rotatably mounted into their respective framework 32 by conventional means (not shown) and can rotate about their own respective blade axis. The rotation of the blades 30 is coordinated with the rotation of the banks of blades 16, 18 and 20, and the rotation of the rotating member 12 by way of a synchronizing mechanism which is also not shown. Various configurations of a synchronizing mechanism such as gears, gears/chains, electrical motors and the like are possible and would be apparent to a person skilled in the art. Each blade 30 of the bank of blades 16, 18 and 20 proportionally rotates one half of a revolution for each full revolution of the rotating member 12. FIG. 9 shows the incremental rotation of one exemplary bank of blades 16 at 90-degree intervals and also the individual rotation of the blades. A dot "●" is shown on one edge of each blade 30 to illustrate and track the rotation of each blade 30 as the rotating member 12 rotates a complete revolution about the main axis 22. Thus, FIG. 9a shows the position of the blades 30 in a first rotation and FIG. 9b shows the position of the blades 30 in a second rotation, consecutive to the first rotation. It is understood that the position of blades 30 in a third rotation, consecutive to the second rotation, is similar to the configuration shown in FIG. 9a. Thus, the blades 30 continuously rotate between the positions shown in FIGS. 9a and 9b.

It is apparent that in alternative embodiments, the wind turbine 10 can include more or less bank of blades and that the number of blades for each bank can vary. In general, a wind turbine having more banks of blades has a higher efficiency. However, it also increases the cost of the wind turbine as well as its weight and inertia. In an embodiment, the wind turbine will include between 3 and 6 banks of blades.

The ratio between the blade speed and the wind speed can also be varied. The optimal ratio can depend on the wind speed. To adjust this ratio, the wind turbine can include an automatic clutch system. In an embodiment, the ratio between the blade speed and the wind speed can range between 0.5 and 0.9 and, in an alternative embodiment, the ratio can be approximately 0.75.

As mentioned above, in an embodiment, the individual blades 30 can be rotatably mounted to their respective framework 32, which can include or not arms 24, 26. The framework 32 can also rotate about its respective bank axis 33 or can be rotation free, i.e. rotation about their bank axis 33 is prohibited in the working position of the wind turbine 10. The rotation of the blades about their blade axis can be linear or non-linear, i.e. the rotation speed can be uniform and independent of the framework position in a linear movement while the rotation speed is varied in accordance with the framework position in a non-linear movement to maximize the torque generated. Thus, in a non-linear movement, the blade movement or speed can be optimized at each rotation step using a stepper motor and a controller based on information such as the framework position, the ratio between the blade speed and the wind speed, and the wind orientation, amongst others.

The blades can be made from rigid or flexible material, which is typically relatively lightweight, and in one section or in several juxtaposed sections. If the blade is rigid, the camber should be substantially void for the blade to be reversible. Typically, flexible materials provide superior performance. However, they have shorter life expectancy when subjected to UV radiation. Flexible blades can be made from, for instance and without being limitative, carbon, Kevlar®, Mylar®, vectran, Spectra®, Dacron®, nylon, polyester, and the like. Articulated blades, i.e. blades made is several juxtaposed sections from a substantially rigid material and articulately connected to one another provide an interesting alternative. In this embodiment, the relative position of each section can be controlled to maximize the torque generated.

The blades 30 may also comprise a cross-sectional profile adapted to more efficiently produce lift forces from the wind W or passing fluid. The blades can have a rectangular, elliptic, or any other appropriate shape. Rectangular blades have a lower blade lift and a higher drag in comparison with elliptical blades.

To minimize the drag force applied to the blades, the blades can be aligned in line when moving against the wind.

It is apparent that the wind turbine 10 described above could be adapted to extract energy from a flow of water instead of air. It is also apparent that the wind turbine 10 can be fabricated using conventional manufacturing procedures with materials or combinations of suitable materials that would be apparent to a person skilled in the relevant art. A suitable size for the vertical axis wind turbine 10 can be determined based on power output requirements and operating conditions. For example, suitable dimensions would include an overall height of around 24 ft (7.3 m), a blade width of around 2 ft (0.6 m), a blade height of 4 ft (1.2 m), a chordal spacing between each bank axis 33 of around 8 ft (2.4 m). Also, a blade spacing of between ⅓ and ½ of the blade width was found to be acceptable.

As mentioned above, the number of banks of blades 16, 18 and 20 may also be varied. Even one single bank of blade could be used so long as the wind turbine 10 is adapted to permit the single bank of blades to rotate through position IV shown in FIG. 5. For example, this could be achieved by having a diametrically opposed blade used to simply carry the rotation of the single bank of blades past position IV or through the use of an energy storage mechanism such as a flywheel or the like. Also, the number of blades 30 per each bank of blades 16, 18 and 20 can also be modified based on performance and design requirements. Other such configurations would be apparent to one skilled in the art.

The blade support frame can include an upper plate and a lower plate (not shown) mounted respectively above and below the upper and lower arms 24, 26 to concentrate the wind towards the wind turbine 10. In an alternative embodiment, the blades can be mounted directly to the upper and a lower plates and not through upper and lower arms 24, 26.

The above description is meant to be exemplary only, and one skilled in the art will recognize that changes may be made to the embodiments described without department from the scope of the invention disclosed. Still other modifications which fall within the scope of the present invention will be apparent to those skilled in the art, in light of a review of this disclosure, and such modifications are intended to fall within the appended claims.

What is claimed is:

1. An energy extraction device for extracting energy from a flow of fluid, the energy extraction device comprising:
   a rotating member rotatably mounted to a support structure and having a main axis of rotation;
   at least one rotatable bank of blades connected to the rotating member through a connection disposed radially from the main axis of rotation of the rotating member, the at least one bank of blades comprising an array of spaced-apart blades, each of the at least one bank of blades having a bank axis of rotation and each blade being rotatable about its own blade axis; and
   a pitch control system for controlling the angular position of the at least one rotatable bank of blades relative to a direction of the flow of fluid.

2. The energy extraction device as defined in claim 1, wherein the spaced-apart blades of each of the at least one bank of blades are substantially parallel, horizontally spaced-apart and secured together.

3. The energy extraction device as defined in one of claims 1 and 2, wherein each bank axis of rotation and each of the blade axes are substantially parallel to the main axis of rotation of the rotating member.

4. The energy extraction device as defined in claim 1, the rotation speed of the blades about their own axis is controllable.

5. The energy extraction device as defined in one of claims 1 and 4, wherein the angular position of each of the blades relative to the direction of the flow of fluid is controllable and adjusted in accordance with at least one of the speed of the flow of fluid, the direction of the flow of fluid, and a position of the at least one bank of blades including the blade.

6. The energy extraction device as defined in claim 1, wherein the pitch control system further comprises a vane coupled to the at least one bank of blades for adjusting the angular position the at least one bank of blades with the direction of the flow of fluid.

7. The energy extraction device as defined in claim 1, wherein the pitch control system comprises a bank gear coupled to the at least one bank of blades and a reference gear disposed along the main axis, the reference gear being independently rotatable from the rotating member and the bank gear being coupled to the reference gear for relative rotation.

8. The energy extraction device as defined in claim 7, further comprising a stopping actuator coupled to the reference gear for rotating the reference gear.

9. The energy extraction device as defined in claim 7, wherein the pitch control system further comprises a vane coupled to the reference gear, the vane being indicative of the direction of fluid flow.

10. The energy extraction device as defined in claim 9, wherein the stopping actuator induces relative rotation between the vane and the reference gear.

11. The energy extraction device as defined in claim 7, wherein the gear ratio of the reference gear to the bank gear is 1:2.

12. The energy extraction device as defined in claim 1, wherein the pitch control system comprises a vane indicative of the wind direction, a controller operatively connected to the vane for receiving wind direction information, the controller being operatively connected to a motor coupled to the at least one bank of blades for adjusting the angular position of the at least one bank of blades.

13. The energy extraction device as defined in claim 12, wherein the pitch control system further comprises an anemometer operatively connected to the controller.

14. The energy extraction device as defined in claim 1, wherein the rotation speed of the at least one bank of blades is controllable.

15. A vertical axis wind turbine comprising:
   a rotating member mounted to a support structure, having a vertical main axis of rotation, and having a plurality of angularly spaced support arms extending radially from the main axis;
   a plurality of rotatable banks of blades wherein each bank of blades is connected to a corresponding support arm of the rotating member through a connection disposed at a distance from the main axis of rotation of the rotating member, each bank of blades comprising an array of spaced-apart blades, at least one of each of the bank of blades having a bank axis of rotation and each of the blades being rotatable about its own blade axis, the spaced-apart blades of each of the bank of blades being substantially parallel and secured together; and a pitch control system for controlling the angular position of the banks of blades relative to a wind direction.

16. The vertical axis wind turbine as defined in claim 15, wherein each of the banks of blades is rotatable about its own bank axis which is substantially parallel to the main axis of the rotating member.

17. The vertical axis wind turbine as defined in one of claims 15 and 16, wherein each blade is rotatable about its own blade axis and each of the blade axes is substantially parallel to the main axis of the rotating member.

18. The vertical axis wind turbine as defined in claim 17, wherein the rotation speed of the blades about their own axis is controllable.

19. The vertical axis wind turbine as defined in claim 17, wherein the angular position of each of the blades relative to the wind direction is controllable and adjusted in accordance with at least one of the speed of the wind, the wind direction, and a position of the bank of blades including the blade.

20. The vertical axis wind turbine as defined in claim 15, wherein the blades are flexible and the blades of each of the at least one blank of blades are horizontally spaced-apart.

21. The vertical axis wind turbine as defined in claim 15, wherein the pitch control system comprises a reference member indicative of the wind direction.

22. The vertical axis wind turbine as defined in claim 21, wherein the banks of blades are coupled to the reference member for causing the banks of blades to rotate in relation to the reference member.

23. The vertical axis wind turbine as defined in claim 22, further comprising an actuator coupled to the reference member for changing the orientation of the reference member.

24. The vertical axis wind turbine as defined in claim 15, wherein the pitch control system comprises a vane indicative of the wind direction, a controller operatively connected to the vane for receiving wind direction information, the controller being operatively connected to a motor coupled to each of the plurality of banks of blades for adjusting the angular position of the banks of blades.

25. The vertical axis wind turbine as defined in claim 24, wherein the pitch control system further comprises an anemometer operatively connected to the controller.

26. The vertical axis wind turbine as defined in claim 15, wherein the pitch control system comprises bank gears, each being coupled to a respective one of the banks of blades and a reference gear disposed along the main axis, the reference gear being independently rotatable from the rotating member and the bank gears being coupled to the reference gear for relative rotation.

27. The vertical axis wind turbine as defined in claim 26, further comprising a stopping actuator coupled to the reference gear for rotating the reference gear.

28. The vertical axis wind turbine as defined in one of claims 26 and 27, wherein the pitch control system further comprises a vane coupled to the reference gear, the vane being indicative of the wind direction.

29. The vertical axis wind turbine as defined in claim 27, wherein the stopping actuator induces relative rotation between the vane and the reference gear.

30. The vertical axis wind turbine as defined in claim 26, wherein the gear ratio of the reference gear to the bank gear is 1:2.

31. The vertical axis wind turbine as defined in claim 15, wherein the rotation speed of the banks of blades is controllable.

32. A wind turbine comprising:

a rotating member rotatably mounted to a support structure, having a main axis of rotation, and having a plurality of angularly spaced support arms extending radially from the main axis;

a plurality of banks of blades wherein each bank of blades is connected to a corresponding support arm of the rotating member through a connection disposed at a distance from the main axis of rotation of the rotating member, each bank of blades comprising an array of spaced-apart and substantially parallel blades, at least one of each of the banks of blades having a bank axis of rotation and each of the blades being rotatable about its own blade axis; and a pitch control system for controlling the angular position of the banks of blades relative to a wind direction.

33. The wind turbine as defined in claim 32, wherein the spaced-apart blades of each of the banks of blades are substantially parallel, horizontally spaced-apart, and secured together.

34. The wind turbine as defined in one of claims 32 and 33, wherein each of the banks of blades is rotatable about its own bank axis of rotation, which is substantially parallel to the main axis of rotation.

35. The wind turbine as defined in claim 32, wherein each of the blade axes is substantially parallel to the main axis of rotation of the rotating member and at least one of the blade axes of each one of the banks of blades is spaced-apart from a corresponding one of the bank axes of rotation.

36. The wind turbine as defined in one of claims 32 and 33, wherein the rotation speed of the blades about their own axis is controllable.

37. The wind turbine as defined in claim 32, wherein the angular position of each of the blades relative to the wind direction is controllable and adjusted in accordance with at least one of the speed of the wind, the wind direction, and a position of the bank of blades including the blade.

38. The wind turbine as defined in claim 32, wherein the pitch control system comprises a reference member indicative of the wind direction, each bank of blades being rotatably coupled to the reference member for causing the banks of blades to rotate in relation to the reference member.

39. The wind turbine as defined in any claim 32, wherein the pitch control system comprises a vane indicative of the wind direction, a controller operatively connected to the vane for receiving wind direction information, the controller being operatively connected to motors coupled to the plurality of banks of blades.

40. The wind turbine as defined in claim 39, wherein the pitch control system further comprises an anemometer operatively connected to the controller.

41. The wind turbine as defined in claim 32, wherein the pitch control system comprises a bank gear coupled to the banks of blades and a reference gear disposed along the main axis, the reference gear being independently rotatable from the rotating member and the bank gear being coupled to the reference gear for relative rotation.

42. The wind turbine as defined in claim 41, further comprising a stopping actuator coupled to the reference gear for rotating the reference gear.

43. The wind turbine as defined in one of claims 41 and 42, wherein the pitch control system further comprises a vane coupled to the reference gear, the vane being indicative of the wind direction.

44. The wind turbine as defined in claim 42, wherein the stopping actuator induces relative rotation between the vane and the reference gear.

45. The wind turbine as defined in claim 41, wherein the gear ratio of the reference gear to the bank gear is 1:2.

46. The wind turbine as defined in claim 34, wherein the rotation speed of the at least one bank of blades is controllable.

47. A vertical axis wind turbine comprising:
a rotating member rotatably mounted to a support structure and having a vertical main axis of rotation;
at least one rotatable bank of blades connected to the rotating member through a connection disposed radially from the main axis of rotation of the rotating member, the at least one bank of blades comprising an array of spaced-apart blades secured together and each of the at least one bank of blades having a bank axis of rotation, each of the blades being rotatable about its own blade axis, the spaced-apart blades of each of the at least one bank of blades being substantially parallel and secured together; and
a pitch control system for controlling the angular position of the blades relative to a wind direction.

48. The vertical axis wind turbine as claimed in claim 47, wherein the pitch control system controls the angular position of at least one rotatable bank of blades relative to the wind direction.

49. The vertical axis wind turbine as defined in claim 48, wherein each bank axis of rotation and each of the blade axes are substantially parallel to the main axis of rotation of the rotating member.

50. The vertical axis wind turbine as defined in claim 48, wherein the pitch control system comprises a bank gear coupled to the at least one bank of blades and a reference gear disposed along the main axis, the reference gear being independently rotatable from the rotating member and the bank gear being coupled to the reference gear for relative rotation.

51. The vertical axis wind turbine as defined in claim 50, further comprising a stopping actuator coupled to the reference gear for rotating the reference gear.

52. The vertical axis wind turbine as defined in claim 50 and 51, wherein the pitch control system further comprises a vane coupled to the reference gear, the vane being indicative of the wind direction.

53. The vertical axis wind turbine as defined in claim 51, wherein the stopping actuator induces relative rotation between the vane and the reference gear.

54. The vertical axis wind turbine as defined in claim 50, wherein the gear ratio of the reference gear to the bank gear is 1:2.

55. The vertical axis wind turbine as defined in claim 47, wherein the pitch control system comprises a vane indicative of the wind direction, a controller operatively connected to the vane for receiving wind direction information, the controller being operatively connected to a motor coupled to the at least one bank of blades for adjusting the angular position of the at least one bank of blades.

56. The vertical axis wind turbine as defined in claim 55, wherein the pitch control system further comprises an anemometer operatively connected to the controller.

57. The vertical axis wind turbine as defined in claim 47, wherein the rotation speed of the blades about their own axis is controllable.

58. The vertical axis wind turbine as defined in claim 47, wherein the pitch control system further comprises a vane coupled to the at least one bank of blades for adjusting the angular position the at least one bank of blades with the wind direction.

59. The vertical axis wind turbine as defined in claim 47, wherein the angular position of each of the blades relative to the wind direction is controllable and adjusted in accordance with at least one of the speed of the wind, the wind direction, and a position of the at least one bank of blades including the blade.

60. The vertical axis wind turbine as defined in claim 47, wherein the rotation speed of the at least one bank of blades is controllable.

61. The energy extraction device as defined in claim 1, wherein at least one of the blade axes of each one of the banks of blades is spaced-apart from a corresponding one of the bank axes of rotation.

62. The vertical axis wind turbine as defined in claim 15, wherein at least one of the blade axes of each one of the banks of blades is spaced-apart from a corresponding one of the bank axes of rotation.

63. The vertical axis wind turbine as defined in claim 47, wherein at least one of the blade axes of each one of the banks of blades is spaced-apart from a corresponding one of the bank axes of rotation.

64. The vertical axis wind turbine as defined in claim 47, wherein the blades of each of the at least one bank of blades are horizontally spaced-apart.

* * * * *